US008705677B2

(12) United States Patent
Delbue et al.

(10) Patent No.: US 8,705,677 B2
(45) Date of Patent: Apr. 22, 2014

(54) MULTIPLE CHANNEL DISTRIBUTED SYSTEM AND METHOD

(75) Inventors: Roger Delbue, Monroe, NY (US); Stephen Ems, Sloatsburg, NY (US); Hitesh Patel, Pompton Lakes, NJ (US)

(73) Assignee: Teledyne LeCroy, Inc., Thousand Oaks, CA (US)

( * ) Notice: Subject to any disclaimer, the term of this patent is extended or adjusted under 35 U.S.C. 154(b) by 322 days.

(21) Appl. No.: 13/245,940

(22) Filed: Sep. 27, 2011

(65) Prior Publication Data

US 2013/0076409 A1    Mar. 28, 2013

(51) Int. Cl.
*H04L 7/00* (2006.01)

(52) U.S. Cl.
USPC .......................................................... 375/355

(58) Field of Classification Search
CPC ............ H03L 7/00; G06F 1/10; H04L 7/0008
USPC .......................................................... 375/355
See application file for complete search history.

(56) References Cited

U.S. PATENT DOCUMENTS

| 6,269,317 | B1 * | 7/2001 | Schachner et al. ............... 702/91 |
| 6,778,518 | B2 * | 8/2004 | Jesse et al. ..................... 370/338 |
| 7,076,014 | B2 | 7/2006 | Roberts et al. |
| 7,219,037 | B2 | 5/2007 | Pupalaikis et al. |
| 2003/0117899 | A1 * | 6/2003 | Eidson ............................ 368/46 |
| 2003/0177154 | A1 * | 9/2003 | Vrancic ......................... 708/160 |

* cited by examiner

*Primary Examiner* — Juan A Torres
(74) *Attorney, Agent, or Firm* — Gordon Kessler (57) ABSTRACT

A complex acquisition system and method for synchronizing components thereof. The complex acquisition system further including a master acquisition module. The master acquisition module further including an analog to digital acquisition signal generator for generating an analog to digital acquisition signal, a memory acquisition signal generator for generating a memory acquisition signal, a delay calibration signal for generating a delay calibration signal, a step source signal generator for generating a step source signal, and a synchronization module. The complex acquisition system further includes a plurality of slave acquisition modules, each also including a synchronization module. The complex acquisition system additionally includes a distribution system for distributing each of the analog to digital acquisition signal, memory acquisition signal, delay calibration signal and step source signal to each of the synchronization modules in the master and plurality of slave acquisition modules.

5 Claims, 8 Drawing Sheets

MULTIPLE CHANNEL DISTRIBUTED SYSTEM AND METHOD

FIELD OF THE INVENTION

This invention is related generally to a method and apparatus for providing a signal acquisition system having more than four channels. More particularly, the invention is related to a method and apparatus for synchronizing various elements of such a modular acquisition system allowing for any number of channels.

BACKGROUND OF THE INVENTION

Test and measurement apparatuses in general, and oscilloscopes in particular, allow a user to view certain aspects of an electronic or other signal. In the case of a traditional digital oscilloscope, the apparatus allows the user to view an electronic signal presented to an input of the oscilloscope. Each oscilloscope is provided with a number of input channels for receiving signals thereon. Furthermore, each oscilloscope is provided with one or more trigger options in order to allow for the indication of starting and stopping the recordation of data. Many oscilloscopes allow for an internally generated trigger, or for an externally provided trigger to be utilized.

While performing a number of tests or the like, a user may wish to view, compare, or test a plurality of signals at one time. While this is what an oscilloscope is designed to do, it may be the case that the user wishes to acquire more signals than there are available inputs in a particular oscilloscope. Traditionally, the user has not been able to do so, and must resort to acquiring some of the signal, storing them, and then acquiring other of the signals. This method, however, is unacceptable for a number of reasons in that it does not allow the viewing of a large number of simultaneously generated signals.

The need for an acquisition system with more than four channels is growing. When employing a channel combining technique, such as LeCroy® DBI technology as described, for example in U.S. Pat. No. 7,219,037, the entire contents thereof being incorporated herein by reference, and other related patents and applications, such multiple channels are particularly advantageous in order to allow for the acquisition of a large number of channels at extremely high bandwidth. The ability to efficiently build such a system as desired by differing users with differing needs also poses substantial difficulty. While it is possible to build a traditional acquisition system with more than 4 channels, before building any such system, one must query how many channels should be included? Some solutions may benefit from up to eight channels while others may require 64 or more channels. Building a traditional static acquisition system having a highest possible number of channels would pose a substantial cost and computing burden on users requiring substantially lower power.

Yield when producing such a system may also be a problem. Building an acquisition system with channel bandwidth in excess of 15 GHz can be very difficult. Inconsistencies in manufacturing processes may require one or two amplifiers to be changed in a system with only four channels. Producing a 64 channel system may prove to be nearly impossible to properly assemble. Testing requirements would also be difficult and time consuming, requiring complete retesting each time any single amplifier or other critical component was switched out.

Finally, power requirements of such a system are also of concern. Acquisition systems with more than 15 GHz of bandwidth are power hungry. Building a system with more than 4 channels would require extremely complex cooling techniques that would be nearly impossible to manage. Also from a customer point of view a power cord for such a unit would require a large current capacity. Such a requirement is not user friendly, likely requiring an unconventional connector, therefore requiring electrical rewiring in order to support the load and use the system.

Therefore it would be beneficial to provide an improved method and apparatus that overcomes the drawbacks of the prior art, and avoids the problems associated with building an acquisition system with a large number of channels.

Still other objects and advantages of the invention will in part be obvious and will in part be apparent from the specification and the drawings.

SUMMARY OF THE INVENTION

Therefore, in accordance with the invention, a modular acquisition system is provided allowing for the addition of a potentially unlimited number of acquisition channels, but avoiding the problems associated with the traditional manufacture of a single, high channel unit. Thus, by allowing for the modular addition of one or more acquisition modules, not only are power, testing and yield issues remedied, but a user may add additional channels at a later date as necessary.

In accordance with one or more embodiments of the invention, a complex acquisition system is provided, and preferably includes plurality of acquisition modules, including preferably four acquisition channels each, joined together with cabling systems, rather than requiring all channels to be built into a single system. The inventors of the present invention have determined that synchronizing such multiple acquisition modules potentially poses a problem. Distributing the appropriate clocks and synchronizing signals to ensure low jitter and low temperature drift are not easy. Cable interconnect introduces additional unknown delays that have to be removed in a calibration process. Ensuring alignment of the data in time for all the subsystems is problematic. Therefore, various embodiments of the invention will solve these problems determined by the inventors.

Thus, in addition to providing the overall modular system, a synchronization system for synchronizing the various acquisition modules is provided in accordance with embodiments of the invention. Furthermore, each acquisition module is preferably provided with individual cooling units, thus alleviating the substantial cooling problems noted above. Finally, power may be provided to each acquisition module independently, thus avoiding the need for specialized power delivery systems.

The invention accordingly comprises the features of construction, combination of elements, and arrangement of parts which will be exemplified in the construction hereinafter set forth, and the oscilloscope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
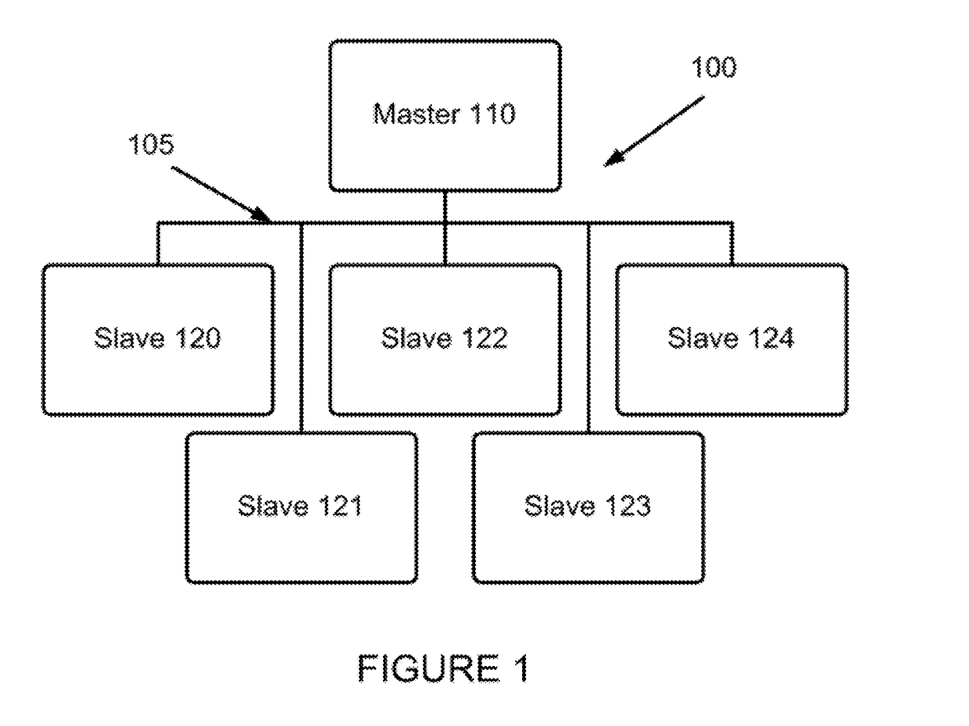
FIG. 1 is a block diagram depicting a relationship between a master and slave acquisition systems in accordance with an embodiment of the invention.

Referring first to FIG. 1, a multi channel acquisition system 100 constructed in accordance with a first embodiment of the invention is shown. As is depicted in FIG. 1, a master acquisition module 110 is provided, and is coupled with one or more slave acquisition modules. In FIG. 1, five such slave acquisition modules are provided (120, 121, 122, 123 and 124) but any number of such modules may be provided. Master acquisition module 110 is preferably coupled with the one or more slave acquisition modules via a cabling system 105. These cables may each directly connect a slave module to an input of the master module, or a single or more cables may be provided from the master module through a switching network and then fanned out to one or more of the slave modules. Furthermore, while a single cable is indicated to each slave module, multiple cables may be employed as appropriate.

Figure 2:
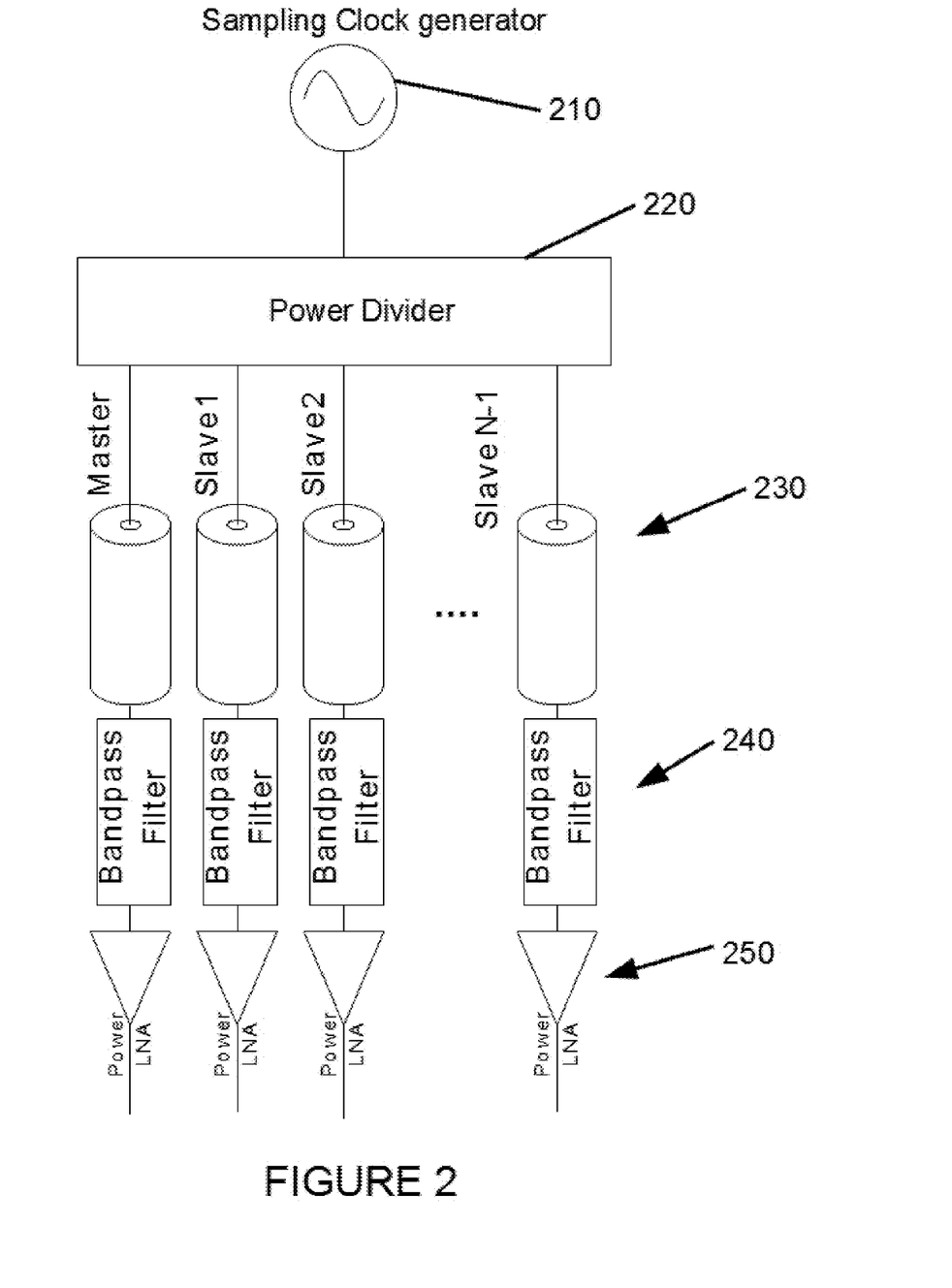
FIG. 2 is a block diagram depicting a first distribution system in accordance with an embodiment of the invention.

Referring next to FIG. 2, a synchronization system between the master and slave acquisition modules will be described. In a distributed system there is preferably one master acquisition module that controls synchronization of all of the slave acquisition modules. In a sense, it is the orchestra director of the acquisition of a number of signals. The slave modules obey the master module, starting and stopping acquisitions when the master so instructs. In such a distributed system, it is desirable that all of the acquisition modules follow the same clock, as if keeping time in an orchestra. Traditionally, when synchronized with low frequency references, systems in general have a tendency to drift relative to each other, this shifting likely affecting the acquisition modules provided in accordance with the invention. Also such a reference clock typically has a low slew rate, and is therefore susceptible to noise pickup from the environment that introduces jitter into any sampling clock derived from this reference clock. A usual interconnect configuration for synchronizing various devices is to daisy chain the reference clock from one subsystem to another. This configuration potentially compounds the jitter problem with each subsystem adding a small amount of jitter. One method for overcoming some of those issues which has been used in the past for synchronizing 2 oscilloscopes together is the following.

Based upon an assumption that the time constant of any drift is small with respect to the duration of one acquisition, a trigger can be used to define a timestamp where the systems to be synchronized are assumed locked in phase and acquire a short acquisition where the phase drift is small and therefore negligible. While this system was sufficient in some circumstances, the systems are still affected by jitter and trigger jitter and therefore not perfectly synchronized between acquisitions.

Therefore, in accordance with embodiments of the present invention, a better approach has been determined, that is to distribute a higher frequency sampling clock (10 GHz) that is less susceptible to noise pickup. The inventors of the present invention have determined that two implementations are possible. First, a power divider with a large output count may be provided. Alternatively, a cascaded system employing multiple layers of power dividers and amplifiers may be employed. FIG. 2 depicts a version of the first alternative constructed in accordance with an embodiment of the invention. As is shown in FIG. 2, a sampling clock generator 210 generates a sampling clock, which is divided into N channels by power divider 220. Each divided signal is fed to a corresponding cable 230 leading to one a master or one of 1-N slave devices. A bandpass filter 240 is provided on each cable, and leads to a power LNA 250 for each device. Unfortunately, the various elements employed in such a system have a tendency to change propagation delay as the temperature of the environment varies. To counteract this problem, the sampling clock signal paths for all the units are preferably matched, i.e. employing the same cable length, same components used in the path, etc. In this manner, any drift in the system will show up as the system drifting with temperature only from a trigger position point of view i.e. the triggered waveform may be slightly shifted in time. Channels within the device would still be matched. This behavior would therefore be identical to an oscilloscope with only 4 channels, but extended to eight or more.

Figure 3:
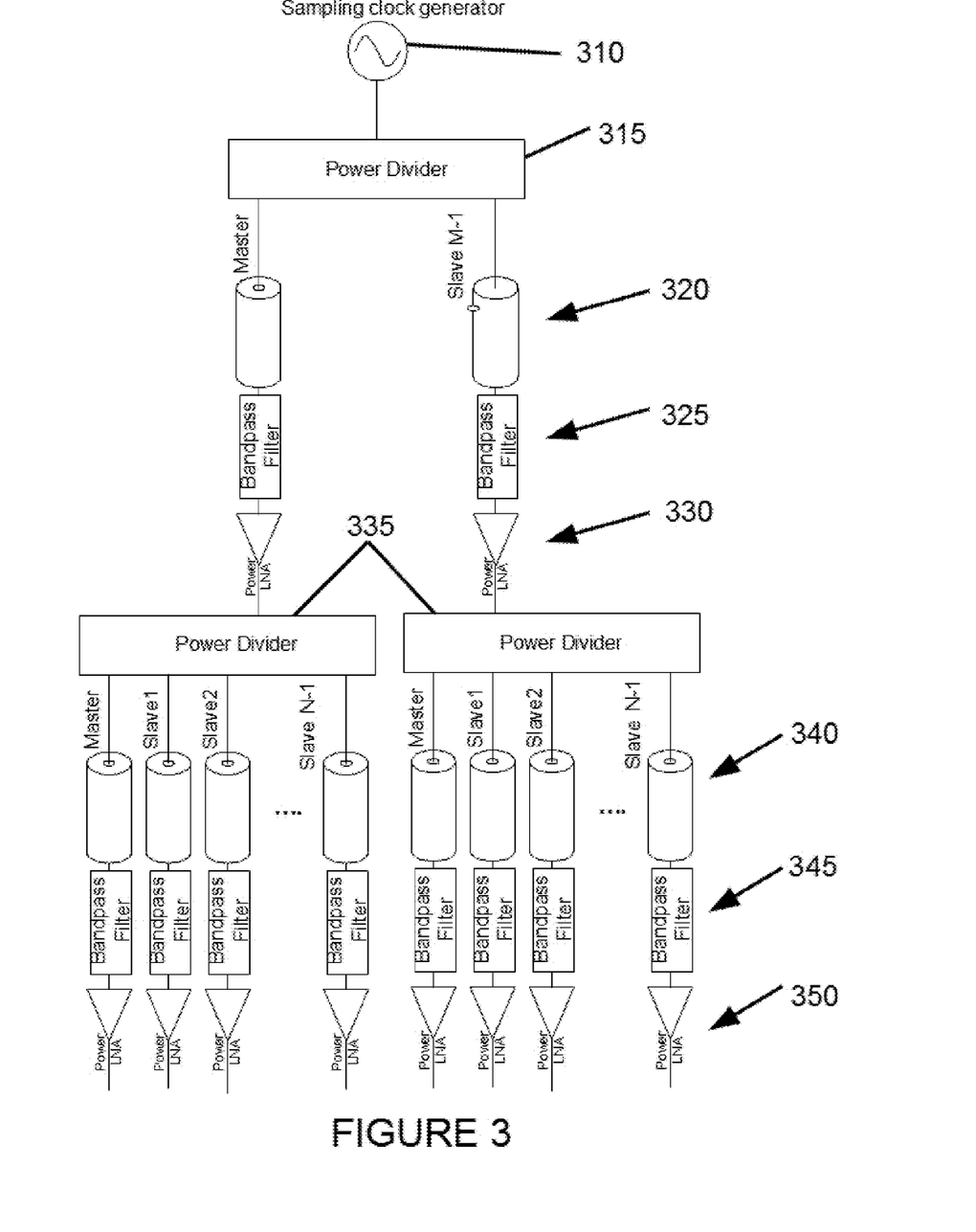
FIG. 3 is a block diagram depicting a second distribution system in accordance with another embodiment of the invention.

FIG. 3 depicts the cascading embodiment of the invention, and includes a sampling clock generator 310, and a power divider 315 for dividing the sampling clock into M−1 channels. Each channel comprises a cable 320 for transporting the divided clock signal through a bandpass filter 325 and an amplifier 330. Each amplifier 330 then passes its clock signal to a corresponding power divider 335 which in turn divides the received clock signal into N−1 second level channels. Each second level channel similarly comprises a cable 340, a bandpass filter 345 and an amplifier 350, thus producing M*N output channels. While two cascading levels are shown, any number of cascading levels may be employed.

Figure 4:
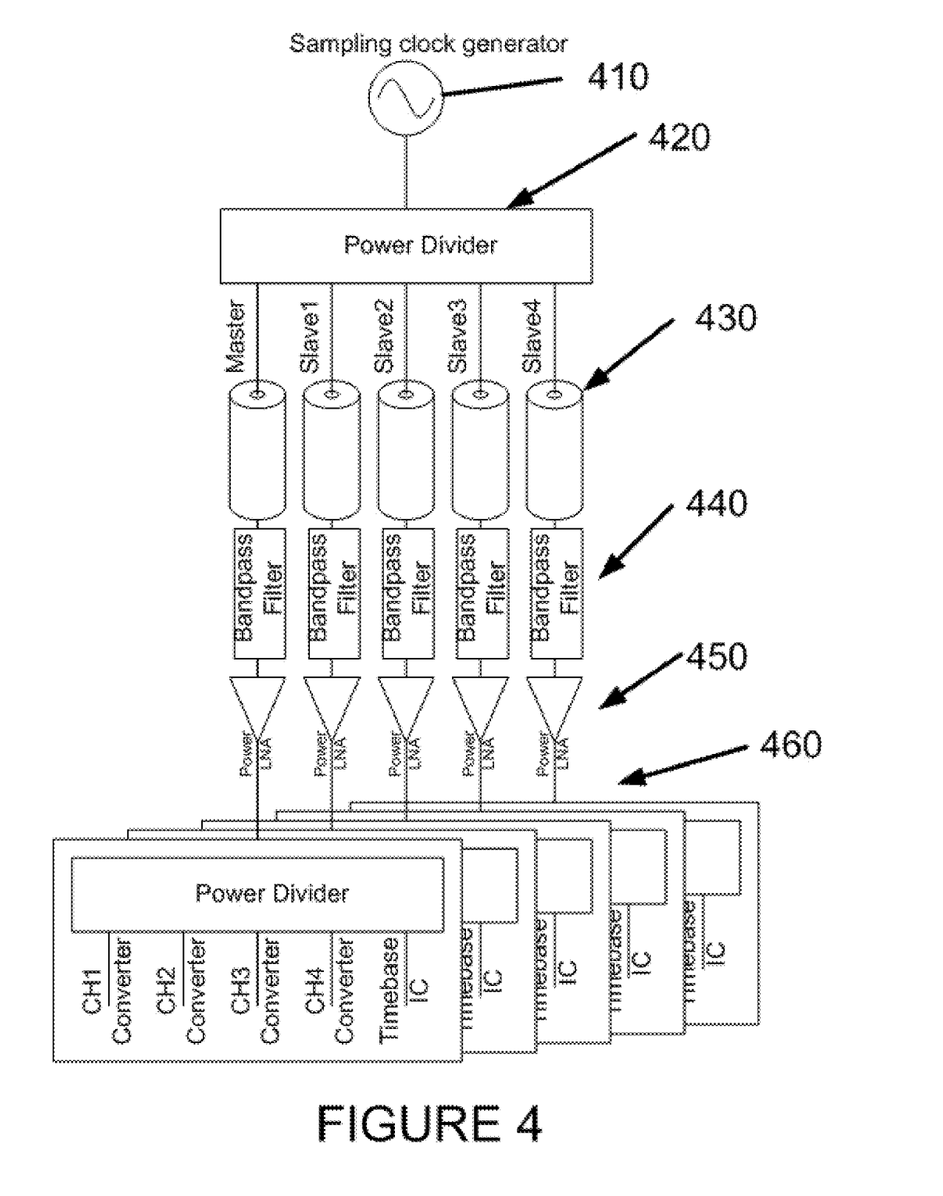
FIG. 4 depicts an acquisition system in accordance with an embodiment of the invention.

A particular preferred exemplary 20 channel acquisition system is shown in FIG. 4, and includes a sampling clock generator 410, a power divider 420 for dividing the sampling clock into five channels. Each channel comprises a cable 430, a bandpass filter 440 and an amplifier 450. Each amplifier 450 provides its corresponding clock signal to a self-contained acquisition module 460. The channels within each acquisition module are synchronized in the manner described above with reference to a single housing unit. Thus each acquisition module 460 preferably comprises a power divider, four acquisition channels and a timebase input.

In each case described by one of the block diagrams shown in FIGS. 2-4, the sampling clock generator is preferably divided into a predetermined number of copies. Each copy will be provided to a corresponding acquisition module (460) via a coax cable (in an exemplary embodiment, nominally 6 feet). The absolute length of the cables is not important provided the amplifier has enough gain to compensate for the length employed. While the length of the cable is not important, it is desirable to have each of the cables be approximately the same length, since it is desirable that the cable propagation delay thermal coefficient for each cable be as similar as possible. A tolerance of one inch in this case is acceptable since propagation delay temperature coefficient is measured at approximately 500 ppm over the 0 to 40 deg C temperature range. One inch of cable has approximately 120 ps of propagation delay so 500 ppm is in the order of 60 fs which is acceptable. If more precision were desired, better matched or less temperature sensitive cables may be employed. The invention is also applicable to cables that are less matched than those noted above.

As noted in FIG. 4, a band pass filter and low noise power amplifier (Power LNA) are employed in each acquisition module (master or slave) and preferably regenerate the signal before it is split again and sent to each sampler for each channel internal to the particular acquisition module, and a timebase IC. The filter and amplifier are also preferably utilized in every branch of the clock tree in order to optimize its delay matching. If additional synchronized systems are desired, one or more extension stages may be inserted. The resulting additional stage of amplification and power division will allow for the clock signal to be distributed to a multiplicity of any desired number of acquisition modules.

Operation of the modular multi channel acquisition system also requires the sharing of various additional signals. These other signals provide communication and synchronization of all elements of the master and distributed slave acquisition modules. As described above, the slave acquisition modules are provided external to the master acquisition module. Thus the transmission of these signals between the various modules of the acquisition system also require the use of cables of imprecise length (while the nominal length is known, as noted above, differences in the absolute length will exist). This introduces additional unknown delays in the synchronization signal path, and effects uncertainty of a phase startup of each of the distributed acquisition modules of the system.

Each acquisition module of the distributed acquisition system, whether master or slave, preferably includes memory sufficient to store captured acquisition data from the data channels associated therewith. For each of these acquisition modules, a memory starting address for storage of the acquisition data is preferably reset at a beginning of each acquisition cycle to synchronize the address in all the memories to a known value. It has been determined by the inventors of the present invention, however, that it may be difficult to reset flip flops or registers comprising these memories when an associated clock is operating at a high clock rate. In order to allow for the resetting of such memories, in accordance with an embodiment of the invention, a first signal, AACQ (or ADC acquisition), is preferably distributed from a common point to control the provision of clocks to the memory in all of the master and slave acquisition modules of the distributed acquisition system. The originator of this AACQ signal is preferably the master acquisition module, but may be generated by any of the other acquisition modules, or a remote source. In any event, the signal is preferably brought to a common point where the signal is fanned out and sent to each acquisition module of the distributed acquisition system (master and slaves). Implementation of this procedure allows for the resetting of the starting addresses of all the memories asynchronously while the clock is stopped.

In addition to synchronizing memory, a phase of the various acquisition modules must be matched. In the inventive distributed acquisition system, channel circuitry in each of the one or more slave acquisition modules may start up with a random phase with respect to the phase of the master circuitry. The inventors of the present invention have therefore determined that a method must be provided to synchronize all of the acquisition modules to a common reference phase. Therefore, in accordance with an embodiment of the present invention, a second signal, MACQ (or Memory Acquisition), is preferably provided as this common reference. Such a MACQ signal preferably starts and stops the storing of the digitized ADC output data to memory in each of the acquisition modules. Because of the distributed nature of the modular acquisition system, the MACQ signal is necessarily distributed to each of the acquisition modules with unknown delay. In order to properly synchronize these signals, a software algorithm such as that described in U.S. Pat. No. 7,076,014, the entire contents thereof being incorporated herein by reference, and a calibration clock are preferably employed to synchronize the local circuitry in the master and slave acquisition modules to the MACQ signal. This synchronization is very important and is further described with respect to the synchronization of memories in each slave acquisition module, as described below.

It is further well known that it may be difficult to design a single ADC with a high sample rate. Therefore, a plurality of lower sample rate ADCs may placed in a single silicon substrate and "interleaved" so that the use of the plurality of lower sample rate ADCs may properly acquire a fast signal. Each ADC is preferably provided with an adjustable delay for aligning properly in time all the ADCs to allow for proper interleaving to produce an equivalent of a high sample rate ADC.

Therefore, in accordance with various embodiments of the present invention, a third signal is preferably generated by the master acquisition module and brought to a common point where the signal is then preferably fanned out and sent to each acquisition module (master and slave). In an exemplary embodiment, this signal may be called a delay calibration clock. This signal is preferably a square wave of a predetermined frequency. The inventive acquisition system distributes this square wave to all of the low sample rate ADCs in all of the various acquisition modules. A software calibration algorithm, such as that described in U.S. Pat. No. 6,269,317, the entire contents thereof being incorporated herein by reference, preferably aligns the low sample rate ADCs in time to a particular one of the plurality of low sample rate ADCs by adjusting the delay of each low sample rate ADC.

Once all the systems are synchronized in the manner as described above, unknown delays introduced into the system by the use of various different length cables, temperatures and the like may be determined by sending a fourth signal, a step signal, for example, from the master acquisition module to all slave acquisition modules and triggered on a channel from the master acquisition module. This signal will experience the same delays as the MACQ signal and can be used to measure and correct for the unknown delays in the signal path.

Figure 5:
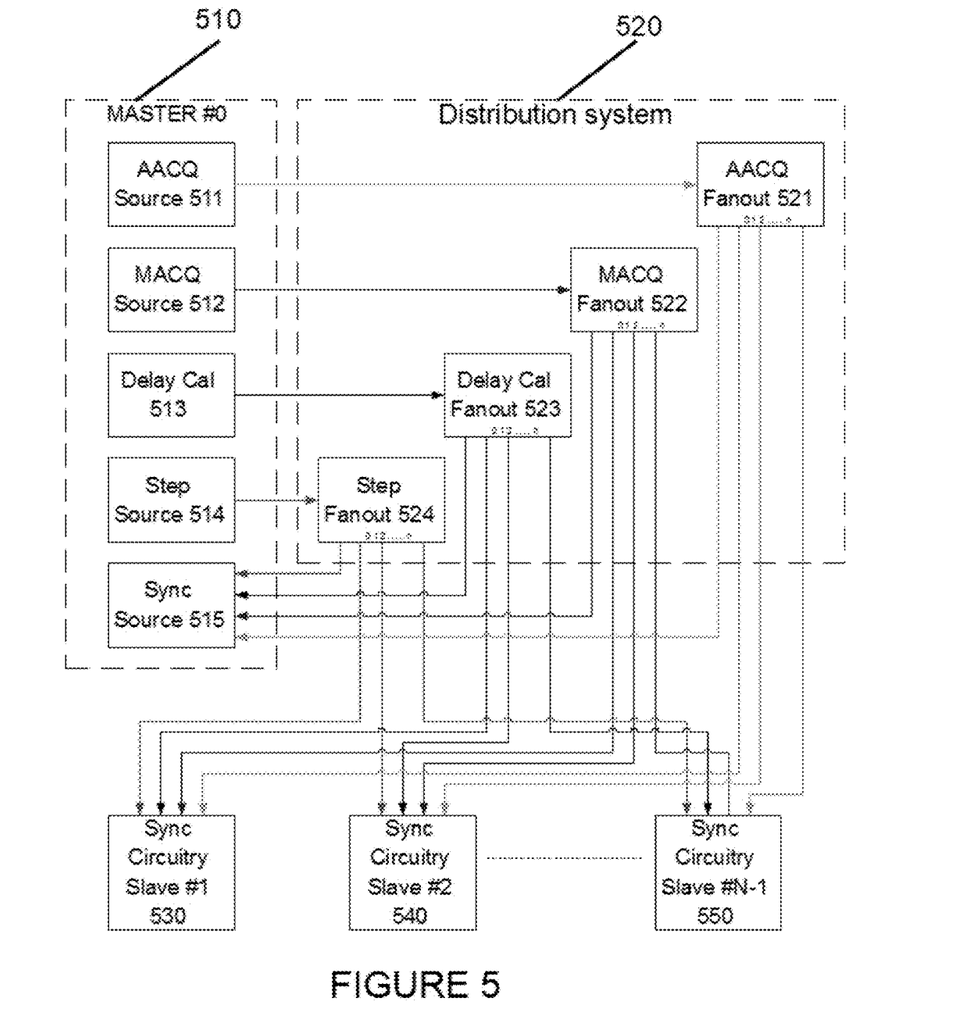
FIG. 5 depicts the distribution of the signals from a master acquisition module via a distribution system back to the master acquisition module and to N slave acquisition modules.

FIG. 5 depicts the distribution of the above-referenced signals from the master acquisition module via the distribution system back to the master acquisition module and to N−1 slave acquisition modules. The distribution system may comprise many levels of fan out depending on the number of slave acquisition modules attached to the distribution system including a cascaded fan out. As is shown in FIG. 5, a master acquisition module 510 initiates an AACQ signal 511, a MACQ signal 512, a delay calibration signal 513, and a step source 514 in accordance with the above description. Each of these signals is thereafter provided to a distribution system 520, and corresponding fan outs. Thus, the AACQ signal is provided to fan out 521, the MACQ signal is provided to a fan out 522, the delay calibration signal is provided to a fan out 523 and the step source is provided to a fan out 524. From these fan outs, each of these signals is provided to synchronization circuitry in each of the master and slave acquisition modules (sync source 515 for the master acquisition module 510, sync source 530 for slave acquisition #1, sync source 540 for slave acquisition module #2, and sync source 540 for slave acquisition module #N−1). Of course, N−1 may represent any number of desired slave acquisition modules.

A number of additional signals may also be provided through the distribution system, including at least acquisition system arm, acquisition trigger and remote power on. Thus, an arm signal may be provided from a master trigger generator to arm a trigger processor in each slave acquisition module. If a slave is selected as a trigger source, it may generate a trigger signal and send it to the master trigger generator in the master, therefore stopping the master acquisition and the other slave acquisitions after a predetermined time in accordance with the trigger. In the case where the master acquisition module is the trigger source, a trigger signal is preferably sent to each of the slave acquisition modules from the master trigger generator of the master acquisition module to trigger the slaves and stop their acquisitions after a predetermined time.

Each of the signals AACQ, MACQ, delay calibration clock and trigger are preferably composed of two signal directions, IN and OUT, to preferably allow two way communication between the various master and slave acquisition modules. Each module can send an OUT signal or receive an IN signal in order to be able to properly control these modules. The distribution system is able to cross connects the signals since an OUT from the generating module becomes an IN signal to the other receiving modules. Finally, a remote "power on" signal may be distributed to the master and all the slaves so their power supplies can be turned on from one signal or switch.

In accordance with the modular acquisition system presented in accordance with various embodiments of the present invention, one of many benefits is the ability to add acquisition modules as needed at a later time. Thus, such addition does not require a return of hardware for an upgrade or recalibration. Rather, a new acquisition module can simply be added to any existing setup in accordance with the following procedure. In order to provide such flexibility, another important aspect of the invention is to be able to test the channels in each single acquisition system (4 in a typical, exemplary implementation) completely independently of any complex acquisition system in which they might be employed, and then integrate all channels in each of the employed modular acquisition modules together. In this manner, each time the configuration of the complex modular acquisition system changes, only the final steps of synchronization of each acquisition module need take place, and not the synchronization of each individual channel. Thus, plug and play functionality is essentially provided for the addition of further acquisition modules and channels to a system. In order to provide such flexibility in accordance with the various embodiments of the invention, a concept of a three layer delay system is employed. A first delay layer consists of delays that are related to a single acquisition system that are preferably synchronized upon manufacture. A second delay layer represents a delay between acquisition systems also known as box to box skew generated upon combination of the individual acquisition modules into the complex acquisition system. A third delay layer consists of any mismatch delay as a result of the use of mismatched and unknown cables.

Therefore, in accordance with embodiments of the invention, the first delay layer may be determined in accordance with calibration procedures for each individual acquisition module in a manner well known to those of ordinary skill in the art for calibration of standard oscilloscopes or other acquisition systems, preferably upon manufacture and initial testing thereof. Thus, once an acquisition system has been tested and all its channel timing and delay characteristics are measured for all of the internal channels, that particular acquisition module as a subsystem is fully described. Thus, when each such acquisition module is subsequently attached to a system of acquisition modules in a complex acquisition system arrangement in accordance with embodiments of the invention, the only uncertainly related to delays would be any external cable propagation delays between the various acquisition modules. Those cables would have a nominal length, not precise enough to eliminate system to subsystem skew, but good enough to allow the system to perform initial calibration and also close enough so that final fine delay correction can be performed to align the signals, preferably by the customer or other who connects the acquisition modules into the complex system. (That could also include customer cable mismatches).

Synchronization of the first delay layer will now be described. The synchronization process is well known and greatly simplified in a single 4 channel instrument, as compared with the calibration between the various acquisition modules in accordance with the invention. This is because there are no unknown or otherwise user-supplied cables involved that need any measurement or compensation. All the signal paths for the synchronization signals are fixed and cannot be changed as they are internal to a single acquisition module.

Internal to each employed Integrated Circuit (IC) that receives, preferably, a 10 GHz clock, a Virtual clock (Vclock) is developed. This clock is referred to as "virtual" because it is used only internally to the particular IC, and not externally. In a particular embodiment of the invention, this clock may be 1/64 of 10 GHz, or any other preferred value. The block size of data that is preferably transferred from an internal input buffer for each IC (upon acquisition) to one or more DRAM memory blocks is preferably 64 bytes in an exemplary embodiment. Further, in accordance with one or more embodiments of the present invention, it is important to have only one channel as the absolute reference for each acquisition module, and thus employ three relative references for the other three channels used in an exemplary embodiment of the invention based on the first channel. By using one channel as a reference channel, and synchronizing the other three channels thereto, it is possible to ensure that channel to channel skew is constant. That is extremely important in order to maintain delays between channels measured during factory calibration, especially when a channel combining technique is used, such as that set forth in U.S. Pat. No. 7,219,037 and other related patents and applications.

Figure 6A:
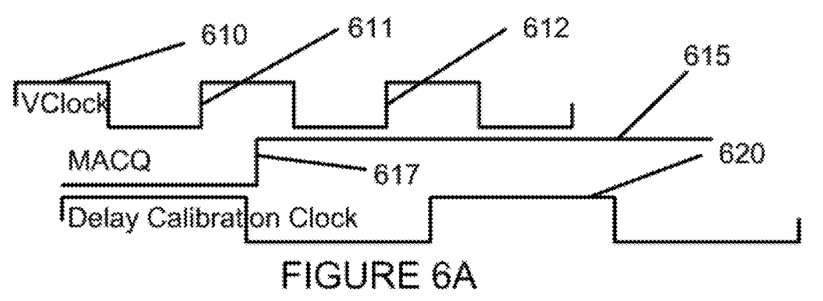
FIGS. 6A and 6B are timing diagrams illustrating the signals in a single acquisition module before and after calibration.
Figure 6B:
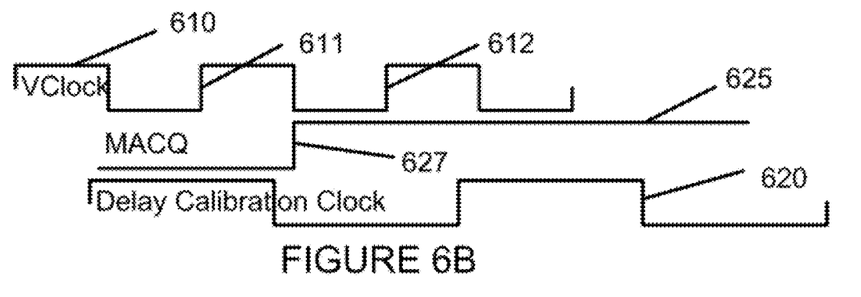

Therefore, an internal buffer memory preferably starts to store data presented from an analog to digital converter (ADC) used to acquire an analog signal into the system presented to the IC at a timing available at a Vclock signal rising edge when the IC receives the MACQ signal (described above) which has been resynchronized by the ADC to the ADC Vclock. At start up the relation between the timebase generated MACQ and the ADC Vclock is unknown, as is shown in an exemplary possibility in FIGS. 6A and 6B. As is shown first in FIG. 6A, Vclock 610 is preferably provided as a square wave having exemplary leading clock edges 611 and 612. Also provided is a delay calibration clock 620 and the MACQ signal 615 having a step 617. As is shown in FIG. 6A, step 617 is not centered between leading edges 611 and 612, which may pose problems upon startup if step 617 happens to be positioned close to one of leading edges 611 and 612. To recover and resynchronize these clocks, a technique such that described in U.S. Pat. No. 7,076,014, the entire contents thereof being incorporated herein by reference, may be employed in the acquisition system. Such a calibration procedure preferably moves the Vclock phase of the ADC with respect to the timebase MACQ. The reference location chosen is important, because if the Timebase provided MACQ is issued too close to a rising edge of the ADC Vclock, the system may randomly use one of two phases of Vclock creating acquisitions that would be skewed one period of Vclock. This is a similar phenomenon to a setup and hold time violation in reference to digital circuits. To avoid this condition, in accordance with embodiments of the invention as shown in FIG. 6B, the system is preferably calibrated so that the rising edge 627 of the step of MACQ signal 625 is identified, and subsequently the ADC Vclock is preferably moved to the middle of the range where it is sure to be stable. To perform such an action, the calibration signal named delay calibration clock is employed, as described above. The determined delay position of MACQ is stored in local memory as a calibration reference value. The above referenced '014 patent describes a preferred embodiment of how the MACQ signal may be delayed by skipping sampling clock periods until it is aligned to the middle of the range. The delay calibration clock measured by the ADC will move when MACQ moves and is used to infer the MACQ position.

Figure 7:
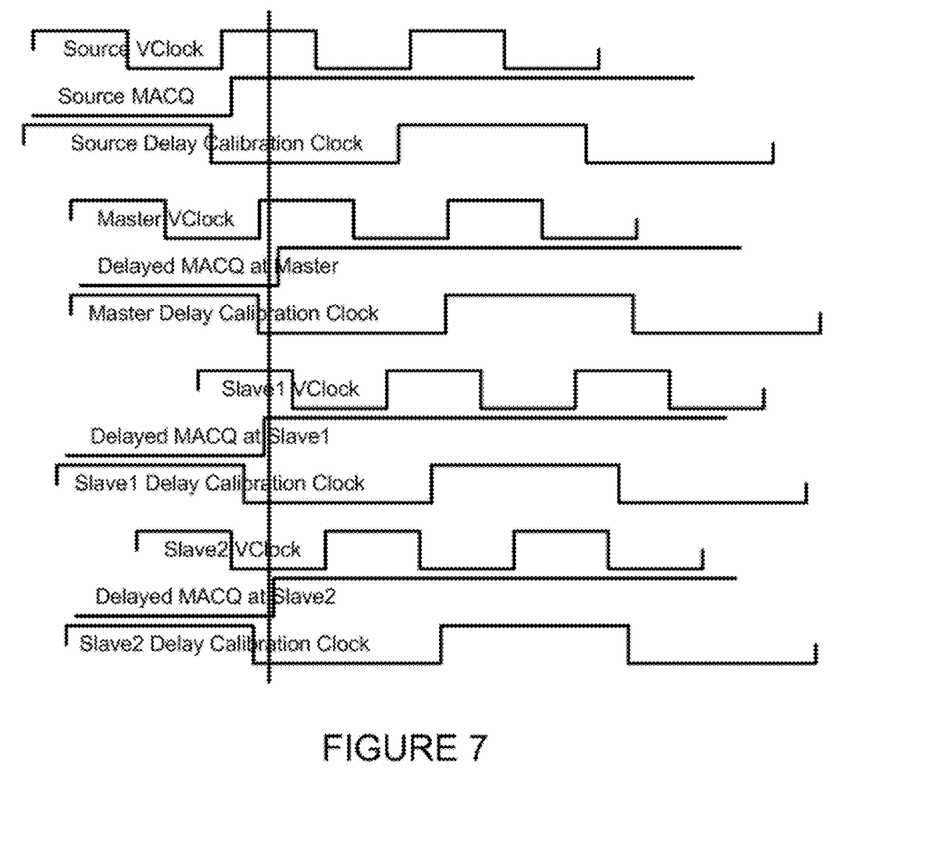
FIG. 7 is a timing diagram illustrating the signals in a multiple module acquisition system before calibration.

In a distributed system such as that in various embodiments of the present invention, the MACQ and the delay calibration clock are preferably the same for all the acquisition modules, and may be distributed in a manner such as that noted above. As also noted above, this signal is preferably triggered by the master acquisition module, which contains the timebase of the system, and which controls the MACQ and other above-described signals. Thus, referring next to FIG. 7 a plurality of Vclock, MACQ, and delay calibration signals of the type shown in FIG. 6 for each of a source, master and multiple slaves are shown. As can be noted in FIG. 7, the Vclocks for each of the systems are not aligned. After power is applied, the phase of the master and slave phase clocks are out of phase relative to each other. This is because the source MACQ and delay calibration signals are distributed to the master and slave acquisition modules with unknown, and unsynchronized delays. Thus, it is possible to notice the different phases at the master and slave Vclocks due to cable interconnect delays and variations in the cable lengths contributing to the slight delays. (This same variation but to a lesser extent, occurs within an acquisition system when initially calibrated, but is adjusted upon synchronization of these signals within a particular acquisition system).

Figure 8:
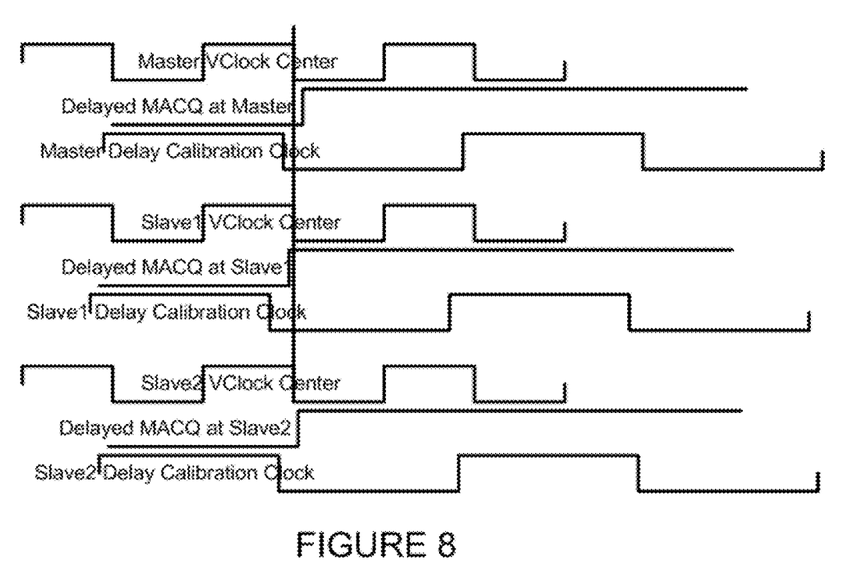
FIG. 8 is a timing diagram illustrating the signals in a multiple module acquisition system after calibration.

Therefore, in accordance with various embodiments of the present invention, applying a similar calibration procedure as described above for a single acquisition system to the current multiple acquisition system scenario will result in the entire system calibrated with MACQ in the middle of the Vclock range of each subsystem, and for alignment of the Vclock signals, as is shown in FIG. 8.

As further noted above, since the cable length in a modular acquisition system in accordance with embodiments of the present invention is nominally constant and may vary slightly, but preferably much less than 50% of the Vclock period (in an exemplary embodiment 3.2 ns) the use of a fixed value for designation of the middle of the Vclock range is sufficient. Thus, upon synchronization of the Vclock signals, the MACQ step is preferably placed the noted 3.2 ns after a leading edge thereof, and thus being placed at approximately the midpoint between leading edges thereof, in accordance with the time of the period of the Vclock signal. Of course, if different clock cycles or periods are used, then different timing delays may similarly be employed to place the MACQ step at approximately the midpoint of the leading edges of the Vclock signal. This method allows for a robust recovery, always finding the middle of the Vclock range.

An additional important aspect of one or more embodiments of the invention is to measure the error of the Vclock reference stored in local memory between the original set up and the resulting position of the Vclock reference for each acquisition module. If the measured error is close to one half a period of the main clock (50 ps), the system may or may not decide to move the reference to another sampling clock period. This may happen if a different clock cable (with a propagation delay delta of ½ clock period+N periods) is used. When measurement uncertainty is included, this may result in the recovered reference to oscillate between two settings and potentially create a variable skew error between different calibrations of one clock period (100 ps in a particular exemplary embodiment of the invention). To prevent this, a new reference is preferably determined, which is preferably the sum of the original reference point and the difference measured in the previous calibration cycle for each acquisition module. This new reference point will be stable for further cycles and acquisitions if the setup is not disturbed. When the system changes, a new correction can be measured and applied in order to be stable between power cycles. Other effects that could modify the reference point are: environmental conditions (Temperature, humidity . . . ), involuntary propagation delay changes because of cable bending and cable replacement, and the like. The process would therefore re-compute the correction value and reapply it to the reference value.

In an alternative embodiment of the invention, another method may be employed to let the system find the middle of the range between leading edges of the Vclock signal when an unknown cable length is used. Since both MACQ and the delay calibration signal are propagated through the same cable, switching on the delay calibration signal simultaneously for all of the acquisition modules will provide information about relative cable delays between the various acquisition modules. The customer or other setup agent may still have to perform a fine delay calibration as small skews may still be present between the various cables.

As noted above, here too it is important to have only one channel as absolute reference for each acquisition module, and three relative references for the other three channels based on the first channel. Since the center of the Vclock signal between leading edges thereof is recovered every time, any error related to the clock is absorbed in the process and does not need to be remembered.

Once the phases are recovered and set in the system, and nominal cable length correction applied or measured with the technique presented above, all that remains is to deskew any small remaining errors related to cable length variations or customer set up skews between the master acquisition module and any slave acquisition modules. Once this information is determined, as long as the set up is not disturbed, the information will stay the same and the system will remain fully synchronized.

While the invention has been described applicable to acquisition systems and oscilloscopes, the invention is intended to be equally applicable to other test and measurement apparatuses and to electronic apparatuses in general. Furthermore, while the synchronization of two apparatuses has been described, it is contemplated that the method and apparatus of the invention may be expanded to provide synchronization to any number of test and measurement apparatuses. Furthermore, the invention may be used in any number of signal generation apparatuses to properly synchronize therebetween.

It will thus be seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawing(s) shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed:

1. A complex acquisition system, comprising:
   a master acquisition module, the master acquisition module comprising an analog to digital acquisition signal generator for generating an analog to digital acquisition signal, a memory acquisition signal generator for generating a memory acquisition signal, a delay calibration signal for generating a delay calibration signal, a step source signal generator for generating a step source signal, and a synchronization module;
   a plurality of slave acquisition modules, each comprising a synchronization module; and
   a distribution system for distributing each of the analog to digital acquisition signal, memory acquisition signal, delay calibration signal and step source signal to each of the synchronization modules in the master and plurality of slave acquisition modules.

2. The complex acquisition system of claim 1, wherein the distribution system comprises a fan out system for fanning out each of the analog to digital acquisition signal, memory acquisition signal, delay calibration signal and step source signal.

3. The complex acquisition system of claim 2, wherein the distribution system is housed within a housing for the master acquisition module.

4. The complex acquisition system of claim 2, wherein the distribution further comprises a plurality of cables, each cable coupling one of the plurality of slave acquisition systems to the master acquisition system.

5. The complex acquisition system of claim 4, wherein the plurality of cables are approximately the same length.

\* \* \* \* \*